United States Patent [19]

Michijima et al.

[11] Patent Number: 5,020,212
[45] Date of Patent: Jun. 4, 1991

[54] METHOD OF MANUFACTURING A MAGNETIC HEAD

[75] Inventors: Masashi Michijima, Nara; Masaru Kadono, Kitakatsuragi; Tatsushi Yamamoto, Ikoma, all of Japan

[73] Assignee: Sharp Corporation, Osaka, Japan

[21] Appl. No.: 529,872

[22] Filed: May 29, 1990

[30] Foreign Application Priority Data

| May 29, 1989 | [JP] | Japan | 1-136485 |
| Jun. 11, 1989 | [JP] | Japan | 1-140913 |
| Aug. 2, 1989 | [JP] | Japan | 1-200842 |
| Aug. 2, 1989 | [JP] | Japan | 1-200843 |
| Aug. 25, 1989 | [JP] | Japan | 1-219199 |

[51] Int. Cl.$^5$ ............................................. G11B 5/42
[52] U.S. Cl. ..................................... 29/603; 360/121; 360/127
[58] Field of Search ................... 29/603; 360/119, 121, 360/125, 127

[56] References Cited

U.S. PATENT DOCUMENTS 4,890,378  1/1990  Suzuki et al. ........................ 29/603
4,901,178  2/1990  Kobayashi et al. ............... 29/603 X Primary Examiner—Carl E. Hall
Attorney, Agent, or Firm—David G. Conlin; Robert M. Asher

[57] ABSTRACT

A method of manufacturing a magnetic head includes a first step of forming rectilinear V grooves on the top surface of a substrate, a second step of forming magnetic films on slant faces of the V grooves, a third step of leveling the top surface of the substrate after filing the V grooves with glass, a forth step of dividing the substrate into first and second substrates, a fifth step of forming grooves for coil winding on the top and bottom surfaces of each substrate, a sixth step of melting the glass of each V groove and bonding the first and second substrates, and a seventh step of slicing the bonded body, the first step including a step of forming the V grooves by means of a first grinding wheel and a step of finishing one of slant faces of the V grooves by means of a second grinding wheel, of which end is V-shaped, so that the slant has smaller surface roughness, the second grinding wheel being shaped such that one of the grinding wheel surfaces comes into contact with one of the slant faces of the V groove while the other grinding wheel surface has a clearance against the other slant face of the V grooves.

13 Claims, 8 Drawing Sheets

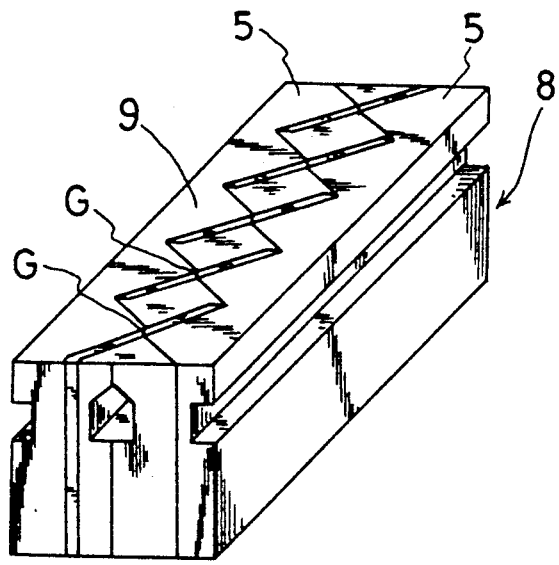

METHOD OF MANUFACTURING A MAGNETIC HEAD

BACKGROUND OF THE INVENTION

1. Field of the Invention

The present invention relates to a method of manufacturing a magnetic head for magnetic recording and reproduction of high density, and more particularly to a method of manufacturing a magnetic head in which a thin film made of a ferromagnetic metal is a core material and is held by a non-magnetic substrate.

2. Description of the Prior Art

At present, a medium having high coercive force such as a metal particulate tape is mainly manufactured as magnetic recording technology is densified. Therefore, it is required that a core material used in a magnetic head has high saturation magnetic flux density.

Under the circumstances, the magnetic head, in which a thin film formed of a ferromagnetic metal is a core material and is held by a non-magnetic substrate or a ferromagnetic ferrite, has been manufactured (see Japanese Unexamined Patent Publication No. 62-54808, Japanese Unexamined Patent Publication No. 64-72305, Japanese Patent Publication No. 64-72306, Japanese Patent Publication No. 64-72307 and Japanese Unexamined Patent Publication No. 63-146204). However, a conventional method of manufacturing the magnetic head is not perfect in view of productivity such as manufacturing efficiency, units of working time, yield or the like, performance of the manufactured magnetic head or manufacturing cost.

SUMMARY OF THE INVENTION

The present invention provides a method of manufacturing a magnetic head comprising a first step of forming a plurality of rectilinear V grooves in parallel on the top surface of a substrate, a second step of forming magnetic films on slant faces of the V grooves, a third step of leveling the top surface of the substrate after filling the V grooves with glass, a fourth step of cutting the substrate along a plane perpendicular to the V grooves to divide the substrate into first and second substrates, a fifth step of forming grooves for coil winding on the top and bottom surfaces of each substrate in the direction perpendicular to the V grooves, a sixth step of melting the glass of each V groove and bonding the first and second substrates to make a bonded body after superposing the first substrate on the second substrate so that the top surfaces of the first and second substrates are come into contact with each other and one end of each magnetic film of the first substrate and that of the second substrate are faced with each other, and a seventh step of slicing the bonded body along a plane which is inclined by a predetermined angle to the bonded surface of the first and second substrates, the first step including a step of forming the V grooves by means of a first grinding wheel and a step of finishing one of slant faces of the V grooves by means of a second grinding wheel, of which end is V-shaped, so that the slant has smaller surface roughness, the second grinding wheel being shaped such that one of the grinding wheel surfaces comes into contact with one of the slant faces of the V groove while the other grinding wheel surface has a clearance against the other slant face of the V groove.

The first and second grinding wheels are, for example, rotary diamond wheels.

It is preferred that the first or second grinding wheel cuts into a dressing board, which is mounted on the side of the substrate, in a moving track thereof when forming the V grooves and thereby dressing is performed.

In the second step, it is preferred that magnetic films are formed over the films which are formed by coating silicon oxide onto the slant faces of the V grooves and carrying out baking.

The coating type silicon oxide is coated onto the slant faces of the V grooves by, for example, a spin-coating method.

In the second step, the magnetic film may be formed on only one of the slant faces of the V groove.

The magnetic film may be ferromagnetic metallic film or a film on which the ferromagnetic metallic films and electric insulating films are alternately laminated.

In the case that the magnetic film is formed on one of the slant faces of the V-groove and laminated by the ferromagnetic metallic films and the electric insulating films, it is preferred that the rotary grinding wheel and the substrate are relatively moved in the direction of easy flow to that of rotation of the rotary grinding wheel so as to cause the grinding wheel to transverse an array of the V grooves from the slant face having the magnetic film to the slant surface having no magnetic film of each V groove when the grooves for coil winding in the fifth step are formed by the rotary grinding wheel.

In the sixth step, it is preferred that the step of heat-treating the glass of the bonded body at a higher temperature than a transition point thereof after forming the bonded body is further added.

Preferably, the sixth step further includes a step of grinding one of exposed V groove end surfaces of the bonded body like a cylindrical surface in the direction of the grooves for coil winding. It is desirable that the seventh step includes a step of forming second V grooves, which are parallel with each other and have a predetermined angle to a plane perpendicular to the grooves for coiling, on the cylindrical surface of the bonded body at a predetermined pitch and a step of cutting the bonded body with planes which are parallel with the second V grooves through the bottoms of the second V grooves.

BRIEF DESCRIPTION OF THE DRAWINGS

FIGS. 1 to 3 are side views showing main manufacturing steps of one embodiment of the present invention;

FIGS. 4 to 7 are perspective views showing the main manufacturing steps of one embodiment of the present invention;

FIG. 8 is a perspective view of a magnetic head obtained in the main manufacturing steps;

FIGS. 9 and 10 are cross-sectional views of a grinding wheel used in the step shown in FIG. 1;

FIG. 11 is a perspective view showing a state in which a dressing plate is mounted on the side of the substrate;

FIG. 12 is a perspective view showing a part of the step shown in FIG. 1;

FIGS. 13 and 14 are plan and side views for explaining a spin-coating method in the step shown in FIG. 1, respectively;

FIGS. 15 and 16 are side views showing a state in which a coating film is formed by the spin-coating method;

FIG. 17 is a side view for explaining the step shown in FIG. 5;

FIGS. 18 and 19 are enlarged views of main portions in FIG. 17;

FIG. 20 is a frequency-inductance characteristic view of the manufactured magnetic head;

FIG. 21 is a side view showing the main portions of the step in FIG. 7;

FIG. 22 is a perspective view showing an example of the manufactured head chip;

FIG. 23 is an enlarged side view of the main portions of FIG. 22; and

FIG. 24 is a characteristic view showing variation of a medium sliding surface width of the head chip and that of a gap depth.

DESCRIPTION OF THE PREFERRED EMBODIMENTS

A method of manufacturing a magnetic head according to the present invention primarily comprises the first to seventh steps to be discussed below.

First step

As shown in FIG. 1, a plurality of rectilinear V grooves 2 are consecutively formed in parallel on the top surface of a substrate 1 by a rotary grinding wheel.

Moreover, while a non-magnetic substrate such as photosensitive crystallized glass, crystallized glass, ceramics or the like is commonly used as the substrate 1, the substrate made of a magnetic material such as a ferromagnetic ferrite may be used. In this case, the substrate is mainly selected on the basis of a wear characteristic. In addition, it is desirable that the substrate is selected in consideration of inductance of the desired magnetic head.

Second step

In a method of forming thin films in which the direction of flying of particles contributing to vacuum evaporation such as electron beam evaporation method is kept constant, a magnetic film, i.e. a lamination 3, in which ferromagnetic metallic thin films and electric insulating thin films are alternately formed, is formed on one of the slant faces of the V groove 2 by utilizing self-shadowing effect (FIG. 2). The ferromagnetic metals are formed of FeAlSi alloys (Trademark: SENDUST), FeNi alloys (Trademark: PERMALLOY) and the like. The electric insulating thin films are formed of $SiO_2$, $Al_2O_3$ and the like. An appropriate value of the thickness of the ferromagnetic metallic layer depends on frequency band in which the magnetic head is operated, permeability of the ferromagnetic metal, resistivity or the like. The electric insulating thin film has such a thickness that short-circuit is not caused between the ferromagnetic metallic thin films (generally 0.1 to 0.2 μm). A metallic thin film such as Cr, Ta or the like is formed with a thickness of 0.1 to 1 μm in order to protect the lamination 3 from glass filled in the V groove 2 at the next step and to increase wetting with the glass.

Third step

As shown in FIG. 3, the V groove 2 is filled with low melting point glass 4 and the top surface of the substrate 1 is leveled by removing excessive glass. It is desirable that the low melting point glass 4 has a wear characteristic equivalent to that of the substrate 1 and a yielding point of 350° to 500° C.

Fourth step

As shown in FIG. 4, a plurality of core blocks 5 are obtained by cutting the substrate 1 along a broken line. The cutting pitch is decided according to the dimension of the final form of the magnetic head.

Fifth step

A boat-shaped groove 6 for coil winding and an outer groove 7 for coil winding opposite thereto are cut by a grinding wheel on a side 5a having the V grooves 2 of the core block 5 and opposite side thereto, respectively. Thereafter, the surface 5a on which the boat-shaped groove 6 is formed is precisely polished. Then, a thin film made of a non-magnetic material to become a gap of the magnetic head is formed on the polished surface 5a.

Sixth step

The laminations 3, in which the ferromagnetic metallic thin films and the electric insulating thin films are laminated in a pair of core blocks 5, 5, are positioned and fixed, for example, so as to be arranged rectilinearly (FIG. 6). The pair of core blocks 5, 5 are bonded by melting the glass 4 filled in the V grooves 2 with heat to form a magnetic head bar 8 including a plurality of magnetic gap portions G. Thereafter, a surface 9 on the side to become a medium sliding surface is ground like a cylindrical surface. If necessary, the width of the medium sliding surface is controlled.

Seventh step

A plurality of magnetic head chips are obtained by cutting the magnetic head bar 8 along the plane which is inclined by an azimuth angle of the magnetic head to the bonded surface of the core blocks 5,5, as shown in FIG. 7. Furthermore, bonding and fixing of the magnetic head chips to a base plate (not shown), winding of coil, finishing of a tape sliding face by tape-polishing and the like are carried out. Thereby, the magnetic head shown in FIG. 8 can be obtained.

In the following, main portions of the above steps will be described in more detail.

(1) Forming of V grooves by a plurality of grinding wheels

In the first step, a plurality of grooves 2 are consecutively formed on the surface of the substrate 1 at a pitch in consideration of the final thickness of the magnetic head, cutting allowance for division. The grinding wheel 11 is a first diamond wheel of which grain diameter is 8 to 16 μm as shown in FIG. 9. Then, a grinding wheel 12 is moved on the grooves 2 so as to cut them slightly and thereby finishing is given. The grinding wheel 12 is a second diamond wheel of which average grain diameter is not more than 4 μm as shown in FIG. 10. The grinding wheel 12 has two grinding wheel surfaces opposed to each other and is shaped such that an angle β between one grinding wheel surface 13 and a center line of the diamond wheel is smaller than an angle α between the other grinding wheel surface 14 and the center line of the diamond wheel. Namely, in the case that the grooves 2 are formed by means of the grinding wheel 11 having the angle α between each grinding wheel surface and the center line as shown in FIG. 9 and thereafter the walls of the grooves are finished by the grinding wheel 12, the grinding wheel surface 14 having the angle α finishes one of the walls of the groove 2, i.e. the slant face forming the magnetic film lamination 3 in the second step at a predetermined surface roughness. On the other hand, a clearance is made between the grinding wheel surface 13 having the angle β and the other wall of the groove. Therefore, the grinding wheel surface 13 does not abrade the other wall.

According to the method mentioned above, in the case that finishing of each groove is carried out by the second diamond wheel, the walls are finished with a clearance made between one of the walls of the groove and one of the grinding wheel surfaces opposed to each other. Namely, one of grinding wheel surfaces finishes one of the walls of the groove at a predetermined surface roughness, while the other grinding wheel surface does not come into contact with the other wall of the grooves and therefore does not abrade it. Accordingly, one of the grinding wheel surfaces of the second diamond wheel does not cause glazing or loading of the diamond grains. Consequently, the substrate can be prevented from being broken in the walls of the grooves. Moreover, the ferromagnetic thin films can be uniformly formed on the walls having a predetermined surface roughness in the grooves. Thereby, the efficient magnetic head, in which the good characteristic of the ferromagnetic thin films is made the best of, can be manufactured.

(2) Dressing of a grinding wheel by a dressing board

As shown in FIG. 11, a dressing board 13 is placed on the side of the the substrate 1 to be approximately flush with the substrate 1 when forming the V grooves by means of the plurality of grinding wheels mentioned above. Then, a plurality of grooves 2 are consecutively formed on the surface of the substrate 1 at a pitch in consideration of the final thickness of the magnetic head, cutting allowance for division while cutting the dressing board 13 by means of a diamond wheel (not shown). The effect is much the same except for a case in which the dressing board 13 has extremely larger surface roughness than the diamond grain diameter of the diamond wheel. In practice, the dressing board 13, of which surface roughness is about #1000 to #3000, is used. If the surface roughness is not the same as the diamond grain diameter, the diamond wheel may be damaged.

According to the method mentioned above, in the case that the finishing of each groove is at least carried out by the second diamond wheel 12, the dressing board 13 placed on the side of the substrate is cut into by the second diamond wheel 12 and thereby the dressing of the diamond wheel is automatically performed. Accordingly, the glazing or loading of diamond grains in the diamond wheel can be prevented. In addition, the finishing of each groove can be made good and uniform, and the substrate can be prevented from being broken. Consequently, the effect that the work of manufacturing the magnetic head is made efficient and the yield of the head is improved can be obtained.

Since the dressing board is placed in a moving trace of the diamond wheel, the dressing of the diamond wheel can be performed without disturbing the moving trace.

(3) Enhancement of surface roughness of V grooves

If necessary, the following steps are added to the first step in order to further reduce the surface roughness of the V grooves.

Namely, coating type silicon oxide liquid 14 is dropped onto the slant faces of the V grooves 2 as shown in FIG. 12, then excessive liquid is removed by centrifugal force with use of a spin-coating method and thereafter its baking is carried out by an electric furnace. In this case, the substrate 1 is deviated from the center O on a rotary plate 15 for spin-coating and is arranged so that the surface, on which the V grooves are formed, is faced toward the center O, as shown in FIGS. 13 and 14. Further, heat treatment is carried out at the highest temperature or more (for example, 700° C.) experienced in the subsequent steps of manufacturing the magnetic head. The heat treatment may be performed in an atomosphere of oxygen partial pressure in order to maintain stoichiometry of coating type silicon oxide.

The surface roughness of the slant faces of the parallel V grooves is improved by coating silicon oxide on the slant faces and baking the surfaces thus formed. Since the coating thickness of silicon oxide is several thousands Å at most, the large undulations in order of 10 micron cannot be filled up but the small undulations in order of several hundreds Å can be filled up and thereby smoothed. Accordingly, it is not required that the grain size of the grinding wheel used in forming the parallel V grooves is made too small to damage working ability. In addition, since the ferromagnetic metallic thin film or the lamination comprised of the ferromagnetic metallic thin films and the electric insulating thin films is formed on the surface of which surface roughness is improved, the thin film which is excellent in soft magnetism can be obtained and the performance of the magnetic head can be ensured.

While the V grooves are formed by means of two kinds of grinding wheels in the first step mentioned above, the grinding wheel for finishing may be omitted owing to the coating treatment. In the spin-coating method, since the substrate 1, on which the parallel V grooves 2 are formed, is deviated from the center of the rotary plate and top portions 2a of the parallel V grooves are arranged toward the center of the rotary plate, the coating type silicon oxide receives the centrifugal force as shown by arrows in FIG. 16. For this reason, the coating type silicon oxide, which adheres to the top portions 2a of the V grooves convergently, receives the force in the direction of the bottoms of the V grooves 2 and distributed all over the slant faces. Thereby, the thickness of the coated layers in the vicinity of the top of the V groove, which are closely related to the shape precision and performance of the magnetic head, is especially made uniform.

Before forming the ferromagnetic metallic thin film or the lamination comprised of the ferromagnetic metallic thin films and electric insulating thin films, the substrate 1, on which the parallel V grooves having the slant faces thereof coated with the coating type silicon oxide are formed, is heat-treated at the highest temperature or more experienced in the subsequent steps of manufacturing the magnetic head. Therefore, in the subsequent steps, there are not occurred an impediment such as discharge of gas from the coating silicon oxide, breakaway of the ferromagnetic metallic thin film and the lamination comprised of the ferromagnetic metallic thin films and electric insulating thin films from the substrate due to change in quality of the coating silicon oxide or the like.

(4) Forming of grooves for coil winding

The boat-shaped groove 6 is formed on the top surface 5a (on which the V grooves are formed) of the core block 5 in the fifth step in accordance with the following. As shown in FIG. 17, a grinding wheel 16 for forming the boat-shaped groove 6 is provided in a working apparatus so as to rotate in the direction of an arrow A. The core block 5 to be worked is fixed onto a deliver mechanism 17 movable in the direction of an arrow B (in the direction of easy flow to that of rotation of the grinding wheel 16) with the top surface 5a thereof being upward. The core block 5 thus fixed is delivered by the deliver mechanism 17 of the working apparatus in the direction of the arrow B, is come into contact with the grinding wheel 16 and thereby the boat-shaped groove 6 is formed. In the case that the magnetic film 3 is formed by the lamination comprised of the ferromagnetic metallic films and the electric insulating films, the boat-shaped groove 6 is particularly formed in accordance with the following.

Namely, the core block 5 is fixed to the deliver mechanism 17 so that the grinding wheel 16 traverses an array of the V grooves 2 from the slant face having the lamination 3 of the magnetic film to the slant face having no lamination 3 of the magnetic film of each V groove 2, as shown in FIG. 18. Thereby, the ferromagnetic metallic films are prevented from getting over the electric insulating films by virtue of metallic ductility and being electrically and magnetically short-circuited each other at the time of grooving. It has been found that while the short-circuit is not occurred by the method in FIG. 18, the short-circuit is occurred when the grooving is performed with the core block 5 fixed to the deliver mechanism 17 as shown in FIG. 19 and that frequency characteristic of the magnetic head is damaged when the magnetic head is driven at a high frequency.

FIG. 20 shows one example of the frequency characteristic of inductance of the magnetic head. Curve (a) shows the characteristic of the magnetic head manufactured by the method in FIG. 18 and curve (b) shows the characteristics of the magnetic head manufactured by the method in FIG. 19. As seen from FIG. 20, curve (b) causes more damping than curve (a) as the frequency of inductance increases.

(5) Heat treatment of glass bonding two substrates

In the sixth step, the temperature of the glass is far higher than the yielding point thereof. The pressure applied from the outside to the core blocks 5, 5 is substantially supported only by the ferromagnetic thin film 3 at their bonding (gap portion G). Consequently, the pressure applied to the magnetic film 3 is very large. There is possibility that the large internal stress will remain in the vicinity of the gap portion G of the magnetic film after the bonding step and thereby the magnetic characteristic will be deteriorated. Therefore, after bonding the core blocks 5, 5 by re-melting and solidifying the low melting point glass, the heat treatment is further carried out at a higher temperature than the glass transition point. Thereby, the internal stress, which remains on the magnetic films of the gap portion G at the time of bonding, is released. Consequently, the magnetic characteristic of the gap portion G is recovered. The heat treatment is carried out at a higher temperature than the transition point of the low melting point glass used therein. In this case, it is preferred that the temperature is not higher than the yielding point of the low melting point glass. If the heat treatment is carried out after the bonding of the core blocks, it may be carried out either before or after the division into each head chip. Preferably, the heat treatment is carried out before the division into each head chip in that it can be easily handled.

In the present embodiment, the low melting point glass 4, which has a glass transition point of 370° C. and a glass yielding point of 430° C., is used. The glass is selected in consideration of consistency of thermal expansion coefficient of the substrate 1 and the magnetic film 3.

The magnetic head chip thus manufactured is further heat-treated in a vacuum for 2 hours at 420° C.

Reproduced outputs of the magnetic head manufactured without the heat-treatment and the magnetic head manufactured with the heat-treatment were comparatively measured using a metal particulate medium at a relative speed of 7 m/s and a measuring frequency of 6 MHz, respectively. Consequently, it was appreciated that the magnetic head manufactured with the heat-treatment had been improved in the reproduced output by about 1 dB, as compared with the magnetic head manufactured without the heat-treatment.

Moreover, the heat treatment was carried out at a temperature less than the glass transition point. However, the reproduced output was not improved by the heat treatment for 2 hours.

As for the upper limit of the heat treatment temperature, there were not especially occurred problems in carrying out the method above mentioned at a temperature which exceeds the yielding point by about 20° C. However, it is desired that the heat treatment temperature is restricted to the temperature less than the yielding point in consideration of the possibility of the magnetic gap being enlarged by yielding glass. Accordingly, the heat treatment temperature of 420° C. is selected in the present embodiment. In general, there is no possibility that the magnetic gap will be expanded if the heat treatment is performed at a temperature more than the glass transition point and less than the glass yielding point. In addition, the internal stress of the magnetic film in the vicinity of the magnetic gap is released in a relatively short time of 2 hours and thereby the magnetic characteristic is recovered. Consequently, the reproduced output of the magnetic head can be improved.

(6) Decision of a gap depth of a magnetic head

To decide a gap depth easily, the seventh step is performed in accordance with the following. As shown in FIG. 21, the magnetic head bar 8, of which surface 9 is worked like a cylindrical surface, is first cut into by means of a V-shaped grinding wheel having a point angle θ of about 60° to form V grooves 18 so that the desired width W of the medium sliding surface remains.

While the point angle θ of the grinding wheel is about 60° in the present embodiment, the angle θ is decided in consideration of the relative speed between the medium and the magnetic head or the wear characteristic of the substrate material of the magnetic head. In practice, it is desirable that the angle θ is about 40° to 80°.

Subsequently, wires of a wire saw (not shown) are arranged at such an interval that they are passed through the bottoms 18a of the V grooves 18 respectively, and then the magnetic head bar 8 is cut. Consequently, magnetic head chips 19 shown in FIG. 22 are produced.

The magnetic head chips have the construction in which the magnetic film lamination 3 is held by the substrate 1 and the low melting point glass 4. Therefore, it is difficult to obtain an accurate value of the gap depth from the side of the chip because the contact portion of the lamination 3 is looked at through the low melting point glass 4.

In the following, there will be described a procedure in which the gap depth is practically decided. FIG. 23 shows the vicinity of the medium sliding surface on the top of the magnetic head chip in FIG. 22.

The head chip initially has a cylindrical surface, as indicated by a dotted line in FIG. 23. It is possible to directly measure the initial gap depth at both ends of the magnetic head bar 8 (FIG. 21). Accordingly, the initial gap depth of the magnetic head chip cut out of the bar 8 depends on the working precision of the bar 8, i.e. the longitudinal straightness of the bar 8 in the grinding of the boat-shaped groove 6 and the cylindrical surface. The dispersion of the gap depth among chips is about $\pm 1 \mu m$.

Immediately after the chips are cut out, the widths of the medium sliding surfaces are respectively measured on the gaps. The value thus obtained is supposed to be an initial sliding surface width l. When the state mentioned above is regarded as an initial state and a suitable amount of tape-polishing is carried out, the relationship between variation $\Delta Cw$ of the width of the medium sliding surface and variation $\Delta gd$ of the gap depth is theoretically $\Delta Cw = 2 \cdot \tan \theta \cdot \Delta gd$, as shown in FIG. 23. When the tape-polishing is practically performed, the relationship shown in FIG. 24 is obtained.

The gap depth $\Delta gd$ after the tape-polishing in FIG. 24 is measured with the sides of the chip cut off and thereby the bonding (gap portion) of the magnetic film lamination 3 exposed.

As seen from FIG. 24, the proportional relationship between $\Delta Cw$ and $\Delta gd$ is $\Delta Cw = 1.3 \Delta gd$ in the present embodiment. The dispersion of the straight line in FIG. 24 is within $\pm 1.5 \mu m$.

Accordingly, once a measurement is performed for the grinding wheel, the gap depth of the head can be decided on the basis of the proportional relationship at any time.

Even if the head is placed on a drum such as a drum for tape-polishing, a drum for practical usage or the like, the gap depth can be measured at any time. Therefore, the gap depth can be easily controlled and thereby the working efficiency in the process steps can be improved.

What is claimed is:

1. A method of manufacturing a magnetic head comprising:

forming a plurality of rectilinear V grooves in parallel on the top surface of a substrate by means of a first grinding wheel, each V groove having two slanted faces;

finishing one of the slanted faces of the V grooves by means of a second grinding wheel, having two outer surfaces forming a V-shape, the second grinding wheel being shaped such that one of the grinding wheel surfaces comes into contact with said one of the slanted faces of the V groove while the other grinding wheel surface has a clearance against the other slanted face of the V groove, forming magnetic films on the slanted faces of the V grooves, leveling the top surface of the substrate after filling the V grooves with glass, cutting the substrate along a plane perpendicular to the V grooves to divide the substrate into first and second substrates, forming grooves for coil winding on the top and bottom surfaces of each substrate in the direction perpendicular to the V grooves, melting the glass of each V groove and bonding the first and second substrates to make a bonded body after superposing the first substrate on the second substrate so that the top surfaces of the first and second substrates contact each other and a magnetic gap is formed between each magnetic film of the first substrate and that of the second substrate, and slicing the bonded body along a plane which is inclined by a predetermined angle to the bonded surface of the first and second substrates.

2. A method of manufacturing a magnetic head according to claim 1, wherein the magnetic film is formed on only one of the slanted faces of each V groove in the step of forming magnetic films.

3. A method of manufacturing a magnetic head according to claim 2, wherein the magnetic films comprise ferromagnetic metallic films and electric insulating films which are alternately laminated.

4. A method of manufacturing a magnetic head according to claim 3, wherein said step of forming grooves for coil winding comprises moving the substate relative to a rotary grinding wheel in the direction of easy flow to that of rotation of the rotary grinding wheel so as to cause the grinding wheel to traverse an array of V grooves from the slanted face with the magnetic film to the slanted face without the magnetic film of each V groove.

5. A method of manufacturing a magnetic head according to claim 4, further comprising the steps of grinding one of exposed V groove end surfaces of the bonded body like a cylindrical surface in the direction of the coil winding groove and forming second V grooves, which are parallel with each other and have a predetermined angle to a plane perpendicular to the grooves for coil winding, on the cylindrical surface of the bonded body at a predetermined pitch and wherein the bonded body is sliced along the bottoms of the second V grooves.

6. A method of manufacturing a magnetic head according to claim 1, wherein the first or second grinding wheel cuts into a dressing board, which is mounted on the side of the substrate, in a moving track thereof when forming the V grooves and thereby dressing is performed.

7. A method of manufacturing a magnetic head according to claim 4, wherein the first or second grinding wheel cuts into a dressing board, which is mounted on the side of the substrate, in a moving track thereof when forming the V grooves and thereby dressing is performed.

8. A method of manufacturing a magnetic head according to claim 7, further comprising the steps of grinding one of the exposed V groove end surfaces of, the bonded body like a cylindrical surface in the direction of the grooves for coil winding and forming second V grooves, which are parallel with each other and have a predetermined angle to a plane perpendicular to the grooves for coil winding, on the cylindrical surface of the bonded body at a predetermined pitch and wherein the bonded body is sliced along the bottoms of the second grooves.

9. A method of manufacturing a magnetic head according to claim 8, further comprising a step of heat-treating glass of the bonded body at a higher temperature than the transition point thereof after forming the bonded body.

10. A method of manufacturing a magnetic head according to claim 1, further comprising a step of heat-treating the glass of the bonded body at a higher temperature than the transition point thereof after forming the bonded body.

11. A method of manufacturing a magnetic head according to claim 4, further comprising a step of heat-treating the glass of the bonded body at a higher temperature than the transition point thereof after forming the bonded body.

12. A method of manufacturing a magnetic head according to claim 1, wherein the magnetic films are formed over films which are formed by coating silicon oxide onto the slanted faces of the V grooves and baking the films formed by the silicon oxide.

13. A method of manufacturing a magnetic head according to claim 12, wherein the coating of silicon oxide is performed by spin-coating.

* * * * *